UNITED STATES PATENT OFFICE.

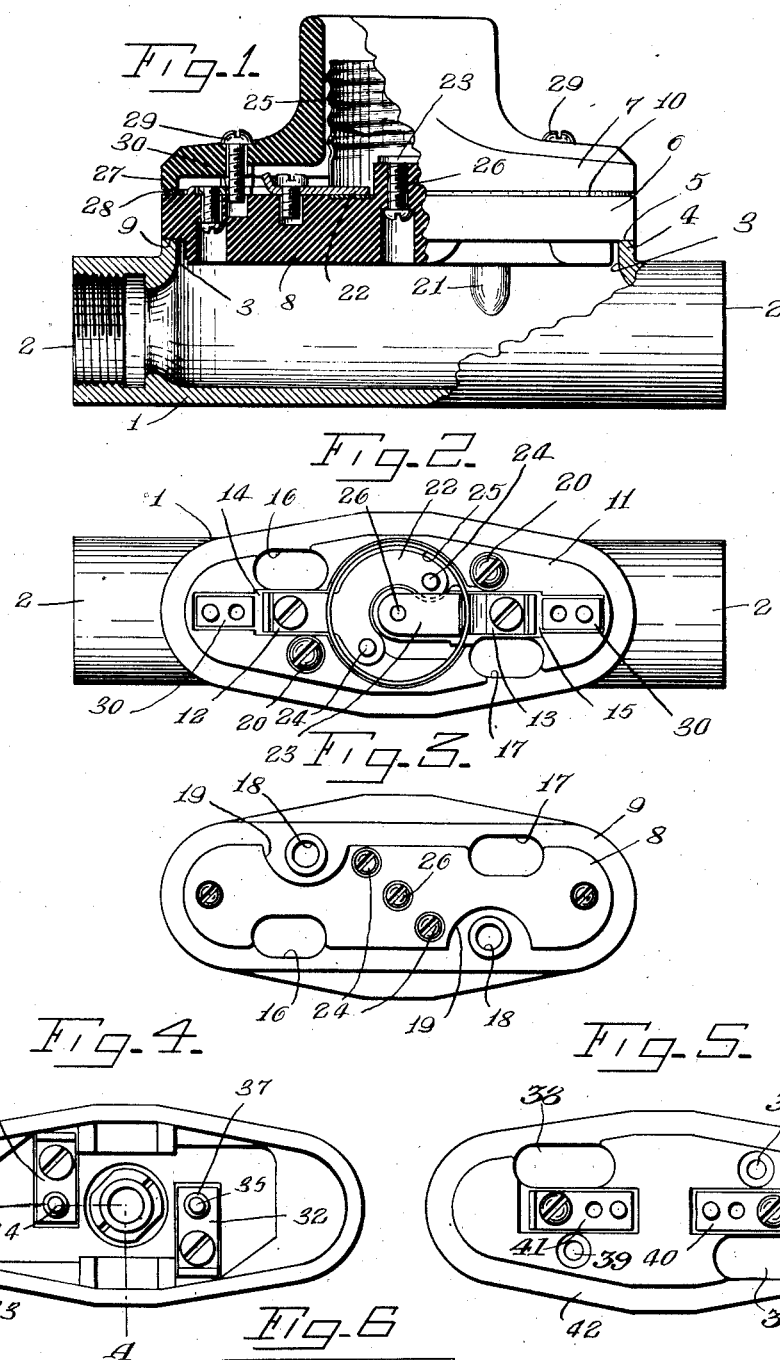

FLOYD C. SMITH, OF SYRACUSE, NEW YORK, ASSIGNOR TO CROUSE-HINDS COMPANY, OF SYRACUSE, NEW YORK, A CORPORATION OF NEW YORK.

ELECTRICAL APPLIANCE FOR CONDUIT OUTLET-BOXES.

1,248,569.     Specification of Letters Patent.     Patented Dec. 4, 1917.

Application filed May 6, 1911. Serial No. 625,519.

*To all whom it may concern:*

Be it known that I, FLOYD C. SMITH, of Syracuse, in the county of Onondaga and State of New York, have invented a certain new and useful Electrical Appliance for Conduit Outlet-Boxes, of which the following is a specification.

This invention has for its object an electrical appliance for use with certain conduit outlet boxes, and it consists in the novel features of construction hereinafter set forth and claimed.

In describing this invention reference is had to the accompanying drawing in which like characters designate corresponding parts in all the views.

Figure 1 is an elevation, partly in section, of one form of this electrical appliance adapted to one type of conduit outlet box.

Fig. 2 is a plan of parts seen in Fig. 1, the cap being removed.

Fig. 3 is an inverted view of the base of the appliance.

Figs. 4 and 5 are respectively, the inner face view and a plan of a different type of electrical appliance from that shown in the preceding figures.

Fig. 6 is a sectional view on line "A—A", Fig. 4.

1 is an electric conduit outlet box having means, as internally threaded nipples 2 at its opposite ends, for connection with the electric conduit by which the electric wires are inclosed, the outlet box also having an elongated opening 3 in one of its sides. The outlet box is here shown as in the form of a conduit having a lengthwise opening on one side thereof, and an outturned lip 4 around such opening, such lip 4 having a seat 5 at its edge for the electrical appliance to be described.

6 is the base of the electrical appliance and 7 is the cap thereof mounted on the base.

The base 6 is preferably provided with a reduced portion 8 on its inner side and a ledge 9 at the base of the reduced portion, said reduced portion extending into the opening 3 and shown in Fig. 1, and the ledge 9 resting on the edge of the wall around the opening 3, that is the seat 5 of the lip 4. The base 6 is also provided with a channel 10 along the margin of its upper face, such channel forming a raised table 11 on which are supported contact plates 12 and 13 to which the line wires are secured. Said contact plates 12 and 13 are preferably arranged in recesses 14 and 15 formed in the table on opposite sides of the center of the base and extending in a direction lengthwise of the base.

The base 6 is also formed with wire openings or slots 16 and 17 opening through its inner and outer faces and located diagonally opposite each other, and between the contact plates 12 and 13, respectively, and opposite side edges of the base, said slots opening through the face of the table and extending partly in the ledge 9 and partly in such reduced portion 8 as clearly seen in Fig. 3.

The base 6 is formed with holes 18 opening through the face of the table 11 and through the bottoms of cutouts 19 extending inwardly from the side edges of the reduced portion 8. Said cutouts and holes 18 are located diagonally opposite each other and on the opposite sides of the recesses 14 and 15 to those on which the wire slots 16, 17 are arranged.

20 are screws extending through the holes 18 and threading in lugs, as the lug 21, provided on the inner face of the box 1.

22 and 23 are terminals connected respectively to, and usually formed integral with, the contact plates 12 and 13, the terminal 22 being shown as connected to the base by screws 24 and as clamping the outer shell contact terminal 25 of a lamp socket in position on the base, the outer shell of sleeve contact terminal 25 being formed with the usual bottom flange which underlies a portion of the terminal 22 in the usual manner, as will be understood by those skilled in the art, and the terminal 23 being held in position by a screw 26 arranged centrally of the base 6, said terminal 23 constituting the central contact terminal of the lamp socket.

The cap 7 incloses the shell 25 and is mounted on the base, the cap having a flange 27 opposed to the channel 10 and resting on a gasket 28 interposed between the flange 27 and the channel 10.

The cap 7 is secured to the base by means of screws 29 extending through opposite end portions thereof and threading into plates 30 located in extensions of the grooves 14, 15 on the upper face of the base.

As seen in Fig. 4 the appliance, instead of supporting the terminals of the lamp socket, may support the terminals of another form of electrical appliance as a rosette; and in Figs. 4 and 5, the terminals 31 and 32 of the rosette are shown as carried by the cap 33, the cap being secured to the base by screws 34 and 35 threading through hollow screws 36 and 37 associated with the cap, the screws 35 and 36 threading into the terminals 40 and 41 on the base 42. The hollow screws 36 and 37 serve to secure the terminals 31 and 32 to the cap.

The base 42, shown in Fig. 5, is provided with diametrically opposed openings 38 for the passage of wires and diametrically opposed openings 39 for the reception of fastening members substantially as in the form of my invention disclosed in Figs. 1 to 3, inclusive, and the terminals 40, 41, are located on opposite sides of the middle of the base and one between each pair of openings 38, 39.

In use, the wires which are inclosed by the conduit connected to the nipples 2 of the box 1 are brought upwardly through the wire openings 16 and 17 and secured to the contact plates 12 and 13. An electrical appliance for an outlet box as set forth is particularly advantageous in that the terminals and wire openings are arranged close together and parts of opposite polarity are thoroughly insulated.

What I claim is:

1. An electrical appliance adapted to be mounted on a conduit outlet box, the appliance including a base and a cap mounted on the base, the base having terminal plates arranged on opposite sides of its center and extending in a direction lengthwise of the base, the base being formed with wire openings therethrough and located diagonally opposite each other and between the terminal plates and respectively the opposite side edges of the base and with holes therethrough for fastening screws, the holes being located on the sides of the terminal plates opposite to that on which the wire openings are located, and the holes being located diagonally opposite each other, substantially as and for the purpose set forth.

2. An electrical appliance adapted to be mounted on a conduit outlet box, the appliance including a base and a cap mounted on the base, the base being formed on its underside with a marginal rabbet which forms a reduced portion, and a ledge at the base of the reduced portion, the base having terminal plates on its upper face, the plates being arranged on opposite sides of the center of the base and extending lengthwise of the base, the base being also formed with wire openings extending therethrough and located between the terminal plates and respectively the opposite side edges of the base, the wire openings extending partly into the reduced portion of the base and partly into the ledge, substantially as and for the purpose described.

3. An electrical appliance adapted to be mounted on a conduit outlet box, the appliance including a base and a cap mounted on the base, the base being formed on its underside with a marginal rabbet which forms a reduced portion, and a ledge at the base of the reduced portion, the base having terminal plates on its upper face, the plates being arranged on opposite sides of the center of the base and extending lengthwise of the base, the base being also formed with wire openings extending therethrough and located between the terminal plates and respectively the opposite side edges of the base, the wire openings extending partly into the reduced portion of the base and partly into the ledge, and the reduced portion being formed with cutouts extending inwardly from its side edges, the cutouts being located on the sides of the longitudinal axis of the base opposite to those on which said wire openings are located, the cutouts being located diagonally opposite each other, the base being also formed with holes extending through upper and lower faces thereof and through the bottoms of the cutouts, substantially as and for the purpose specified.

4. An electrical appliance adapted to be secured to a conduit outlet box, the appliance including a base and a cap mounted on the base, the base and cap being long compared with their width, the base having a channel along the margin of its upper face which forms a central raised table, terminal plates mounted on the table and arranged on opposite sides of the center of the base and extending lengthwise thereof and toward the ends of the base, the base being also formed with wire openings extending therethrough and opening through the table and located diagonally opposite each other and on opposite sides of the terminal plates between said plates and the long side edges of the base, substantially as and for the purpose set forth.

5. An electrical appliance adapted to be mounted on conduit outlet boxes, the appliance comprising a base and a cap, the base having a pair of openings located on opposite sides of the central line thereof, one set being for the purpose of receiving fastening devices for securing the appliance in position, and the other set being wire openings, terminals mounted on the face of the base and extending lengthwise thereof, one terminal being located between the members of one pair of openings and the other terminal being located between the other pair of openings, substantially as and for the purpose described.

In testimony whereof I have hereunto signed my name, in the presence of two attesting witnesses, at Syracuse, in the county of Onondaga, in the State of New York, this 28th day of April, 1911.

FLOYD C. SMITH.

Witnesses:
   WM. CORNELL BLANDING,
   C. C. SCHOENECK.